United States Patent
Takashima

[11] Patent Number: 6,131,503
[45] Date of Patent: Oct. 17, 2000

[54] PISTON RING ASSEMBLY

[75] Inventor: Kazutoshi Takashima, Hamamatsu, Japan

[73] Assignee: Sanshin Kogyo Kabushiki Kaisha, Shizuoka-ken, Japan

[21] Appl. No.: 09/220,513

[22] Filed: Dec. 24, 1998

[30] Foreign Application Priority Data

Dec. 24, 1997 [JP] Japan ................................... 9-354565

[51] Int. Cl.$^7$ ........................................................ F16J 1/00
[52] U.S. Cl. ............................................. 92/172; 123/193.6
[58] Field of Search ................................ 92/192, 193, 198, 92/200, 172, 208; 123/193.6

[56] References Cited

U.S. PATENT DOCUMENTS

| | | | |
|---|---|---|---|
| 4,253,435 | 3/1981 | McCandless | 123/193.6 |
| 4,346,685 | 8/1982 | Fujikawa | 123/193.6 |
| 4,362,136 | 12/1982 | Lipp | 123/193.6 |
| 4,432,313 | 2/1984 | Matlock | 123/193.6 |
| 4,883,029 | 11/1989 | Winston | 123/193.6 |
| 4,941,440 | 7/1990 | Weber et al. | 123/193.6 |
| 4,955,353 | 9/1990 | Amataka et al. | 123/193.6 X |
| 5,067,453 | 11/1991 | Takashima | 123/193.6 |
| 5,450,783 | 9/1995 | Binford . | |
| 5,477,821 | 12/1995 | Chapple | 123/193.6 |
| 5,513,608 | 5/1996 | Takashima et al. . | |
| 5,598,763 | 2/1997 | Rao et al. . | |
| 5,618,046 | 4/1997 | Binford . | |
| 5,655,433 | 8/1997 | Santi . | |
| 5,737,999 | 4/1998 | Ariga | 92/158 |
| 5,779,243 | 7/1998 | Hanlon . | |
| 5,782,217 | 7/1998 | Ito et al. | 123/193.6 |

FOREIGN PATENT DOCUMENTS

| | | | |
|---|---|---|---|
| 56-85545 | 7/1981 | Japan | 123/193.6 |
| 57-198347 | 12/1982 | Japan | 123/193.6 |
| 1041727 | 9/1983 | U.S.S.R. | 123/193.6 |
| 1099118 | 6/1984 | U.S.S.R. | 123/193.6 |
| 1281711 A1 | 1/1987 | U.S.S.R. | 123/193.6 |
| 1423765 A1 | 9/1988 | U.S.S.R. | 123/193.6 |

*Primary Examiner*—John E. Ryznic
*Attorney, Agent, or Firm*—Knobbe, Martens, Olson & Bear LLP

[57] ABSTRACT

A piston and piston ring assembly has a compression ring and a compression ring groove configured to allow proper mating between the two following thermal expansion. The groove is provided with a substantially horizontal lower face. The ring has a bottom surface that is contoured to provide a cross-sectional angle that substantially matches the anticipated deflection of the lower face caused by thermal expansion. Thus, when the piston expands due to temperature changes associated with operating the internal combustion engine, the lower face deflects away from the combustion chamber. The deflection is absorbed by the pre-contoured bottom surface of the ring. Thus, localized high points between the piston ring and the piston ring groove are reduced and the friction originating at such locations is also reduced. Accordingly, the ring and the groove experience reduced friction and reduced wear while the sealing function of the compression ring is enhanced.

13 Claims, 5 Drawing Sheets

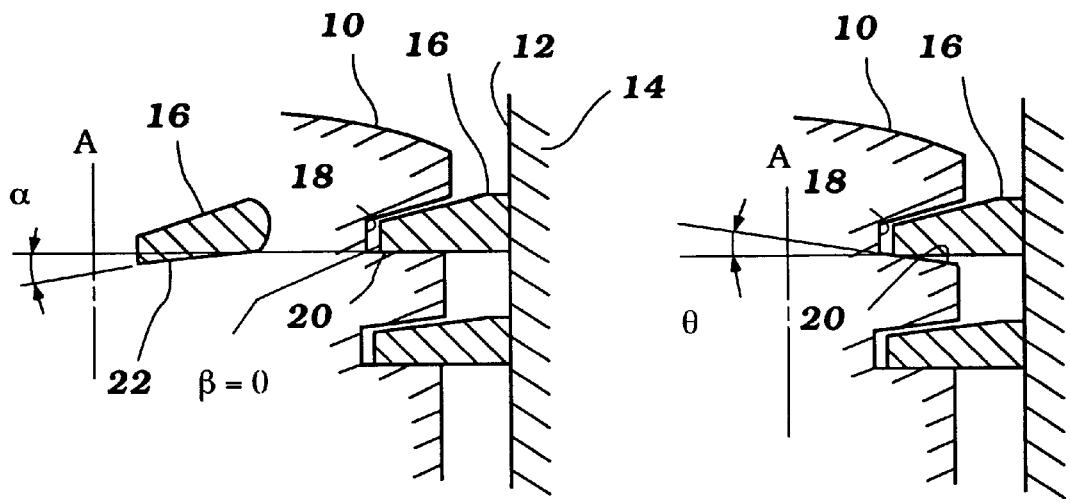
Figure 1(a)
*Prior Art*
Figure 1(b)
*Prior Art*
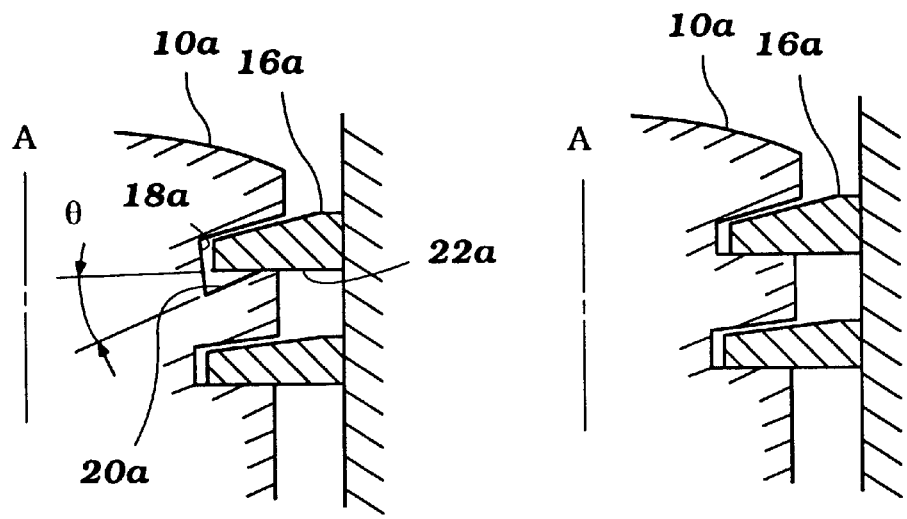
Figure 1(c)
*Prior Art*
Figure 1(d)
*Prior Art*

PISTON RING ASSEMBLY

BACKGROUND OF THE INVENTION

1. Field of the Invention

The present invention generally relates to piston rings for internal combustion engines. In particular, the present invention relates to a top compression rings for such engines.

2. Description of Related Art

Internal combustion engines operate on alternating compression and expansion cycles, which cycles reflect a state of operation within a combustion chamber. During the compression cycle, the compression of an air and fuel mixture typically precedes an ignition of the air and fuel mixture. The ignition of the air and fuel mixture results in combustion of the air and fuel mixture and an accompanying expansion within the combustion chamber. Such ignition and combustion generally increases the temperature of the component surrounding the chamber in which the combustion occurs. The expansion is followed, or accompanied, by an exhaust cycle.

The compression and expansion is generally enabled by a piston that reciprocates within a cylinder bore. Because the diameters of the piston and the receiving cylinder bore differ, a sealing arrangement is necessitated. Accordingly, one or more circumferential grooves are provided within an upper end of the piston. To provide a seal, resilient rings are installed in these grooves, which rings have a slightly larger outside diameter than the piston. The rings generally bear directly against the cylinder wall and create a seal between the sides and surfaces of the piston ring groove and the cylinder wall.

Recognition of the Problem

With reference to FIGS. 1a and 1b, an earlier embodiment of a top compression ring and ring groove are illustrated in a partially cross-sectioned view. As was known, a piston 10 was arranged to reciprocate within a cylinder bore or sleeve 12 of a cylinder block 14. To maintain a substantially sealed combustion chamber, the piston carried a compression ring 16 within an upper ring groove 18. A second ring was also carried within a second ring groove to scrap lubricant from the cylinder bore 12 while the piston 10 reciprocated within the bore 12.

As illustrated in FIG. 1(a), a bottom face 20 of the ring groove 18 was machined to be substantially horizontal such that an angle β was approximately zero (i.e., the surface was normal to a reciprocating axis A of the piston 10). A bottom face 22 of the ring 16 was processed to have a slight taper when the bottom face 22 of the ring 18 was not in contact with the bottom face 20 of the ring groove 18. The angle relative to horizontal of the bottom face is identified in FIG. 1(a) as α.

A problem was identified in that the ring 16 and the groove 18 might properly seat under cool operating conditions or when the engine has not achieved an operating temperature. As the engine was operating and the components began absorbing heat, the components would expand relative to one another and deform slightly due to complex geometries and stresses induced by thermal expansion of the components. Thus, due to such thermal expansion, the configuration of the ring groove and the ring would change as the temperature changed and improper seating between the members would result. The improper seating would create an increase in friction and a corresponding increase in ring or groove wear. Because the ring or groove wear may diminish the useful life of either member and may have a deleterious effect on engine performance over time, a solution was needed.

With reference now to FIG. 1(b), the problem discussed directly above is illustrated therein in the context of a thermally expanded piston and ring. As depicted in exaggerated form, the thermal expansion of the ring groove 18 and ring 16 resulted in an improper seating between the two elements. Specifically, an angle θ would be created between the bottom faces 20, 22.

A potential solution to this thermal-expansion problem is depicted in FIGS. 1(c) and 1(d). Due to the similarity of elements, like elements will be given like reference numerals with suffixes of "a" for purposes of this discussion of the problem solved by the present invention. As illustrated therein, the bottom face 20a of the groove 18a has been machined to have a downwardly inclined face from outside to inside. Specifically, while the engine and its components are cold, the bottom face 20a of the groove slopes downward and inward at the angle of θ, the angle of deflection from above, while the bottom face 22a of the piston ring is designed to be substantially horizontal (again, normal to a reciprocating axis A of the piston 10a). Upon operating and heating to operation temperatures, the bottom face 20a of the groove 18a is thermally expanded and deformed.

Thus, under full-load, the piston groove and the piston ring become properly seated together as a result of thermal expansion. Accordingly, better combustion and gas sealing properties result. This solution, however, suffers from several drawbacks. For instance, due to the complicated geometry of the ring grooves that must be machined in every piston for every engine, manufacturing costs are high. Moreover, the particular ring groove deflection to be anticipated will vary with materials from which the pistons are manufactured due to differing coefficients of thermal expansion between materials and as a result of differing operating temperatures. To a lesser extent, one problem with any piston ring and piston groove fitting is simply the difficulty associated with verifying that the combination of angles and materials has been properly determined (i.e., it is difficult to visually inspect).

SUMMARY OF THE INVENTION

Accordingly, an improved piston and piston ring assembly is desired whereby the piston ring will properly seat against a lower surface of a piston ring groove upon the engine achieving a predetermined operating temperature. Desirably, the piston ring receives the shaping such that any complicated machining may be performed on an external surface as opposed to being performing on an internal surface. This allows visual confirmation of a proper shape being achieved.

Thus, one advantage of the present invention involves contouring the ring surfaces to match a predetermined angular deflection of the lower piston ring groove surface caused by thermal expansion of the piston and piston ring grooves. This allows for easier machining as well as quality control. Additionally, the ring manufacturing machinery may be more easily adapted to modify the ring contour than the machinery involved in cutting ring grooves.

Another advantage of the present invention relates to ring and groove wear. When the ring and the groove do not mate properly, the ring surface rubs on the groove high points and vice versa. This rubbing action may cause premature wear and failure of the rings or grooves. Thus, by creating a proper mating profile of the ring and the groove, localized friction is reduced and, accordingly, wear is reduced.

One feature of the present invention involves a piston and piston ring assembly for a direct injection internal combustion engine. The piston generally comprises a head, at least two circumferential ring grooves positioned proximate the head and a reciprocating axis. The upper groove has a lower face. A first ring is preferably positioned within the upper ring groove and a second ring is preferably positioned within the second ring groove. The first ring may have a top surface and a bottom surface wherein the bottom surface is inclined by a first angle relative to a reference plane defined as normal to the reciprocating axis. The first angle is desirably substantially equal to an angle between a first plane defined by the lower face before thermal expansion and a second plane defined by the lower face after thermal expansion such that the bottom surface of the first ring will be substantially flush with the lower face of the ring groove after thermal expansion.

Another feature of the present invention also relates to a piston and piston ring assembly for use within a cylinder of an internal combustion engine. The piston and piston ring assembly generally comprises a piston having a piston ring groove and a reciprocating axis. The piston ring groove has a lower face. A piston ring may be positioned within the piston ring groove above the lower face. The piston ring desirably has a bottom surface adjacent the lower face such that the bottom surface is inclined relative to a plane normal to the reciprocating axis. Preferably, an angle is defined between the lower face and the bottom surface when the piston ring and the piston have not thermally expanded which is equal to an angle defined by the lower face relative to the plane normal to the reciprocating axis when the piston and piston ring have thermally expanded.

BRIEF DESCRIPTION OF THE DRAWINGS

These and other features, aspects and advantages of the present invention will now be described with reference to the drawings of a preferred embodiment that is intended to illustrate and not to limit the invention, and in which:

FIGS. 1(a)–(d) are depictions of two previous embodiments that led to the present invention;

FIGS. 6(a) and 6(b) are enlarged partial cross-sectional views of a portion of the piston, piston ring and cylinder contained within the circle 6 of FIG. 4, wherein FIG. 6(a) depicts an arrangement prior to thermal expansion and FIG. 6(b) depicts the same arrangement after thermal expansion.

DETAILED DESCRIPTION OF THE PREFERRED EMBODIMENTS OF THE INVENTION

Figure 2:
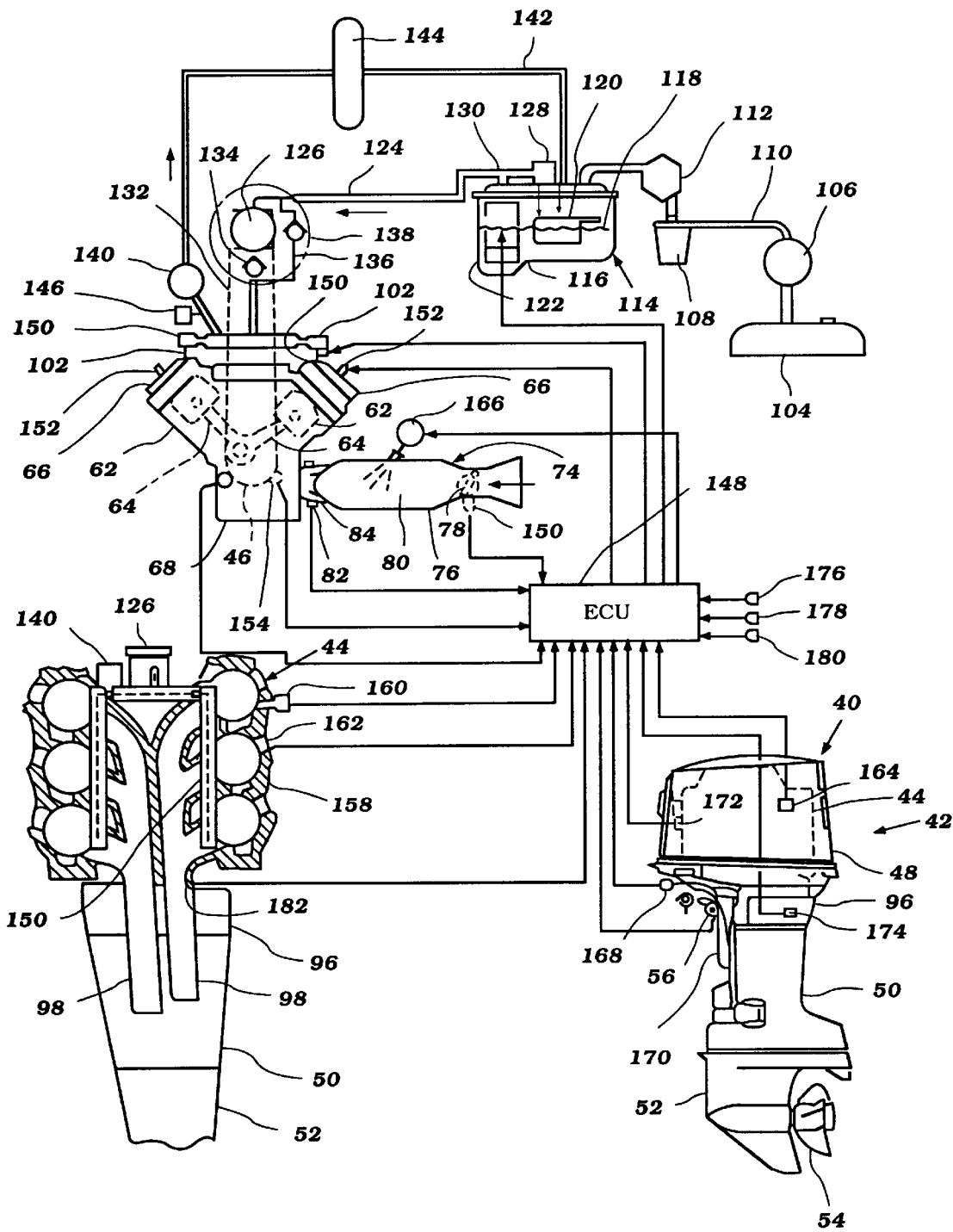
FIG. 2 is a partially schematic view having three portions that are connected by a controlling ECU of an engine having piston rings arranged and configured in accordance with certain aspects of the present invention, the lower right hand portion of this view depicting a side elevational view of an outboard motor, the lower left hand side depicting a rear elevational view of the outboard motor on an enlarged scale and a partial cross-section of the engine taken through the cylinders and exhaust manifold and the upper portion depicting a top plan view of the engine and the fuel supply system with portions shown schematically and in broken line.

Referring initially to FIG. 2, the lower right hand portion of this view illustrates a side elevational of an outboard motor having certain features of the present invention. The outboard motor is indicated generally by the reference numeral 40 and, except as will be hereinafter noted, may be considered to be of a generally conventional construction.

The outboard motor 40 is comprised of a power head 42 that contains a powering internal combustion engine 44. As best seen in the other two portions of this figure, the engine 44 is, in this embodiment, of the V6 type and operates on a two-stroke crankcase compression principal. Although the number of cylinders and cylinder orientation can be varied, the invention has particularly utility in connection with two cycle engines and particularly those having multiple cylinders, but certain aspects of the present invention may also applicable to four cycle engines.

As is typical with outboard motor practice, the engine 44 is supported in the power head 42 so that its crankshaft 46 rotates about a vertically extending axis for a reason that will be described momentarily.

The power head 42 is completed by a protective cowling 48 that surrounds and protects the engine 44. This protective cowling 48 is formed with an air inlet opening so that induction air for operation for the engine 44 can be drawn from the surrounding atmosphere.

The engine 44, and specifically its crankshaft 46, is coupled to a driveshaft (not shown) that depends into and is journaled within a driveshaft housing 50 and lower unit 52 assembly. This is the reason for the vertical orientation of the axis of rotation of the crankshaft 46. This driveshaft (not shown) depends into the lower unit 52 where it drives a propulsion device for an associated watercraft through a suitable transmission. In the illustrated embodiment, the propulsion device comprises a propeller 54 which is selectively driven in forward and reversed directions through a bevel gear reversing transmission (not shown) of the type well known in this art.

The outboard motor 20 also includes clamping and swivel brackets 56 or another arrangement for mounting it to the transom of an associated watercraft. Since these types of constructions are well known in the art, further description of them is not believed to be necessary to permit those skilled in the art to practice the invention. The mounting arrangement is such, however, that the height and trim angle of the propeller 54 may be adjusted, even during running.

Figure 3:
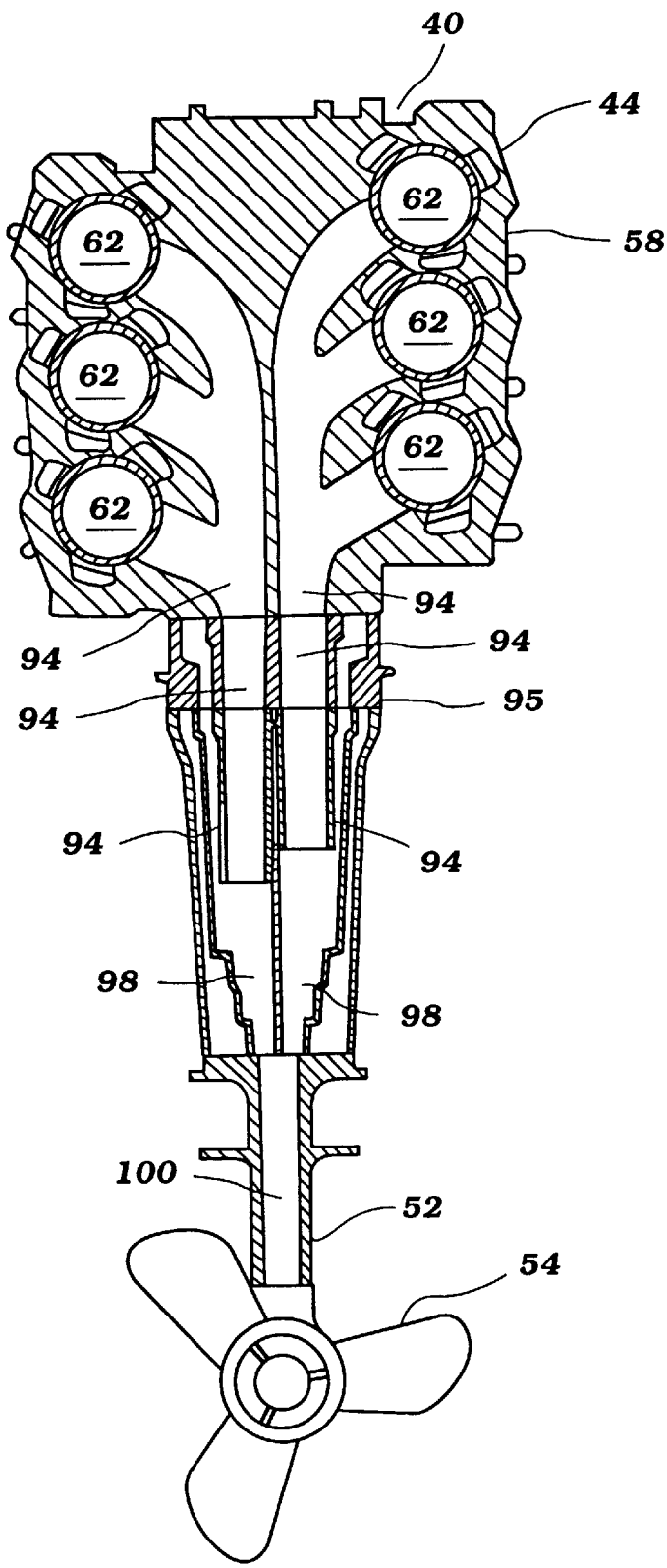
FIG. 3 is an enlarged and more complete view of the outboard motor as shown in the lower left hand view of FIG. 2.

Referring now primarily to the lower left hand view and the upper view of FIG. 2 and additionally to FIG. 3, the engine 44 includes a cylinder block, indicated generally by the reference numeral 58. Because of the V-type configuration employed in this embodiment, the cylinder block 58 is formed with two cylinder banks, each of which has three vertically spaced cylinder bores 60. Pistons 62 are slidably supported in the cylinder bores 60. The pistons 62 are connected by means of connecting rods 64 to the throws of the crankshaft 46 for driving it in a known manner.

Cylinder head assemblies 66, indicated generally by the reference numeral 66 are affixed to the banks of the cylinder block 58 and close the cylinder bores 60. These cylinder head assemblies 66, the cylinder bores 60 and the pistons 62 form the combustion chambers 68 of the engine 44.

The crankshaft 46 rotates in a crankcase chamber defined by the cylinder block 58 and a crankcase member 70 that is affixed thereto. As is typical with two cycle crankcase compression engines, the sections of the crankcase chamber, indicated schematically at 72, associated with each of the cylinder bores 60 are sealed from each other.

An air charge is delivered to these individual crankcase chamber sections 72 by an air induction system which appears also in the upper portion of FIG. 2 and which is indicated generally by the reference numeral 74. This induction system 74 includes an air inlet device 76 that may include a silencing arrangement and which draws air from within the protective cowling 48 that has been admitted through the aforenoted inlet opening.

A throttle valve 78 is provided in throttle bodies that communicate with the intake device 76 and deliver it to intake manifold runners 80 of an intake manifold assembly. The throttle valves 78 are controlled in any suitable manner to satisfy the operator demand. The intake manifold runners 80 communicate with intake ports 82 formed in the crankcase member 70 and each associated with a respective cylinder bore 60.

Reed type check valves 84 are provided in the manifold runners 80 adjacent the intake ports 82. These reed type check valves 84 permit an air charge to be drawn into the crankcase chambers 72 when the respective pistons 62 are moving upwardly in their cylinder bores 60. As the pistons 62 move downwardly, the charge in the crankcase chambers 72 will be compressed and the respective reed type check valve 84 will close to preclude reverse flow.

Figure 4:
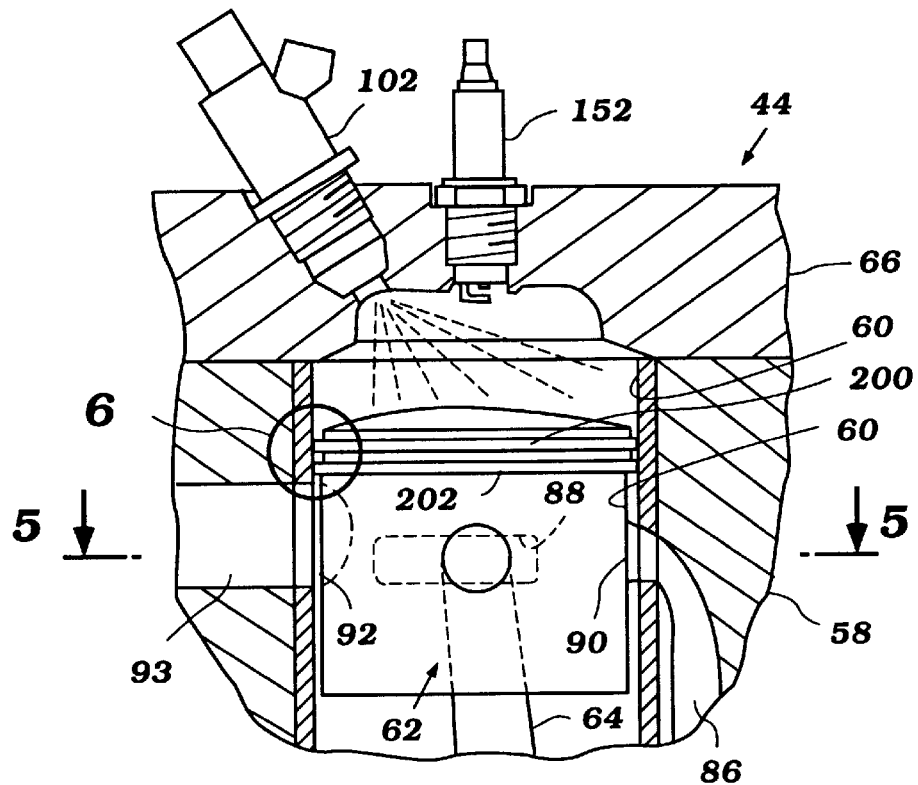
FIG. 4 is an enlarged cross-sectional view taken through a single cylinder of the engine of FIG. 2 depicting a piston ring arrangement configured in accordance with certain aspects of the present invention.
Figure 5:
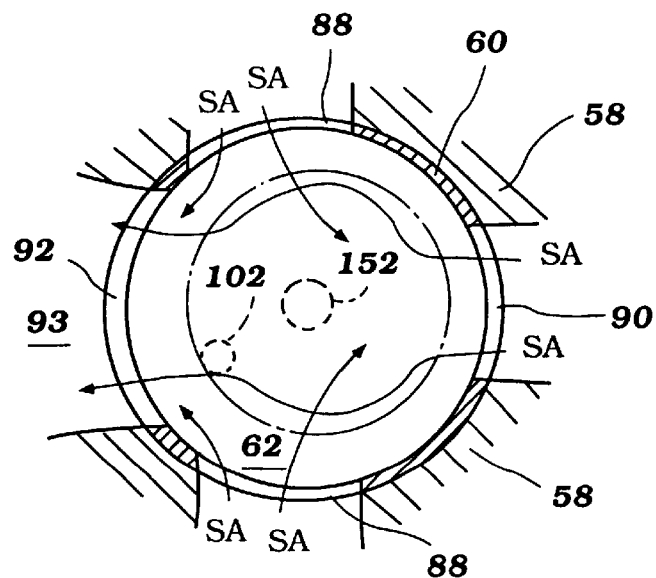
FIG. 5 is a cross-sectional view taken along the line 5—5 in FIG. 4 illustrating a scavenging air flow pattern and a path of injected fuel.

Referring now additionally to FIGS. 4 and 5, it will be seen that each cylinder bore 60 is provided with a scavenging system. In the illustrated embodiment, the scavenging system is of the Schnurl type and includes a pair of side, main scavenge ports 86 and a center, auxiliary scavenge port 88. Scavenge passages 86 communicate the crankcase chambers 68 with each of the scavenge ports 88 and 90. As is well known in two cycle practice, the scavenge ports 88 and 90 are opened and closed by the reciprocation of the pistons 62 in the cylinder bores 60.

It should be noted that the main scavenge ports 88 are disposed on opposite sides of an exhaust port 92 which is diametrically opposite the auxiliary scavenge port 90. As may be best seen in the lower left hand portion of FIG. 2 and in FIG. 3, the exhaust ports 92 communicate with exhaust manifolds 94 via exhaust passages 93, both of which members 93, 94 are formed integrally within the cylinder block 58. Basically, there is an exhaust manifold 94 for each bank of cylinders.

These exhaust manifolds 94 extend through an exhaust guide 95 and terminate in exhaust pipes 96 that depend into a pair of expansion chambers 98 formed in the driveshaft housing 50 and lower unit 52. These expansion chambers 98 communicate with a suitable high-speed underwater exhaust gas discharge and a low-speed above-the-water exhaust gas discharge of any known type.

The underwater exhaust gas discharge is shown primarily in FIG. 3 and includes a conduit 100 that depends through the lower unit 52 and which communicates through the hub underwater discharge formed in the propeller 54.

As has been previously noted, the trim and height of the propeller 54 can be adjusted and this adjustment will change the depth of submersion of the underwater discharge during engine running. In addition, various water conditions may also cause this height to vary during engine running. Thus, the back pressure on the exhaust system will be variable and this back pressure is particularly significant in effecting the rate of air flow in scavenging the combustion chambers 68 of the engine 44. Thus, a condition is present with marine applications that is not existent normally in automotive applications and which can seriously effect feedback control.

As the pistons 62 move downwardly in their cylinder bores 60 toward the bottom dead center position as shown in FIG. 4, the charge compressed in the crankcase chambers 72 will be compressed and eventually transfer to the respective engine combustion chamber, indicated generally by the reference numeral 68 through the scavenge passages 86 and scavenge ports 88 and 90 when they are opened by the movement of the piston 62. The flow of scavenging air is shown in FIGS. 4 and 5 by the arrows SA.

The engine 44 is provided with a direct cylinder fuel injection system. This fuel injection system is shown in part schematically in the upper portion of FIG. 2 and will now be described by particular reference to that figure. Before referring thereto, however, it should be noted that fuel injectors 102 are mounted in the cylinder head assembly 66 so as to spray fuel from this fuel supply system directly into the combustion chambers 68. The location and functioning of these fuel injectors 102 will be described after the system which supplies fuel to them has been described.

As is typical with outboard motor practice, the outboard motor 40 is supplied with fuel from a main fuel tank 104 that is normally mounted within the hull of the associated watercraft. Fuel is supplied from this tank 104 by a first low pressure pump 106 to a fuel filter 108 that is mounted within the protective cowling 48. The connection from the fuel tank 104 to the filter 108 includes a conduit 110 having a quick disconnect coupling of a known type.

A second, engine driven low pressure fuel pump 112 in the power head 42 collects the fuel from the fuel filter 108 and delivers it to a vapor separator, indicated generally by the reference numeral 114. The low pressure fuel pumps 112 may be of the types that are operated by crankcase pressure variations as is well known in this art.

The vapor separator 114 includes an outer housing 116 that is mounted at a suitable location within the protective cowling 48. A level of fuel, indicated at 118 is maintained in this housing 116 by a valve operated by a float 120.

Contained within the housing 116 is an electrically driven pressure pump 122 which develops a higher pressure than the pump 112 but a pressure that is not really high enough for effective high pressure direct cylinder injection.

This fuel is discharged from the vapor separator housing 116 through a supply conduit 124 to a high pressure, engine driven, positive displacement pump 126. The pump 126 may be of any known type and preferably has one or more plungers operated by cams for delivering extremely high pressures at a positive displacement. The pressure at which fuel is delivered to the high pressure pump 126 is regulated by a low pressure regulator 128 in a return line 130 that communicates the pressure line 124 back with the interior of the vapor separator body 114.

The high pressure pump 126 delivers fuel under pressure to a main fuel manifold 132 through a conduit in which a check valve 134 is positioned. A parallel conduit 136 extends around the high pressure pump 126 to the main fuel manifold. A check valve 138 is provided in this bypass line so that when the high pressure pump 126 is generating high pressure fluid, no flow will occur through the line 136.

A high pressure regulator 140 is provided in the main fuel manifold 132 and limits the maximum pressure of the fuel supply to the fuel injectors 102. This is done by dumping fuel back to the vapor separator assembly 114 through a return line 142. A fuel heat exchanger or cooler 144 may be provided in this return line 142 so as to ensure that the fuel is not at too high a temperature.

A pressure sensing device 146 is provided also in the main fuel manifold 132 for providing a fuel pressure signal to an ECU, indicated at 148 in FIG. 2 for controlling the engine systems, as will be described.

The main fuel manifold 132 supplies fuel to a pair of fuel rails 150 each of which is associated with a respective one of the cylinder banks. The fuel rails 150 each supply fuel in a known manner to the fuel injectors 102 of the respective cylinder banks.

As seen in FIGS. 4 and 5, the fuel injectors 102 are mounted in the cylinder head assemblies 66, in the illustrated embodiment, over the exhaust ports 92 on the exhaust side of the engine 44. These injectors 102 spray downwardly toward the heads of the pistons 62. The fuel injectors 102 are preferably of the solenoid operated type and have a solenoid valve which, when opened, controls the discharge of fuel into the combustion chambers 68 (as shown in broken lines in FIG. 4) so as to provide a fuel patch in the combustion chamber 68, the size of which depends upon the duration of fuel injection as will become apparent.

Spark plugs 152 are mounted in the cylinder head assemblies 66 and have their spark gaps disposed substantially on the axis of the cylinder bores 60. These spark plugs 152 are fired by an ignition circuit under the control of the ECU 148.

The ECU 148 controls the timing of firing of the spark plugs 152 and the beginning and duration of fuel injection by the injector 102. To this end, there is provided a number of sensors that sense either engine running conditions, ambient conditions or conditions of the outboard motor 40 that will effect engine performance. Certain of the sensors are shown schematically in FIG. 2 and will be described by reference to that figure. It should be readily apparent to those skilled in the art, however, that other types of sensing and control arrangements may be provided operating within the general parameters which will be set forth later having to do with the timing of initiation of fuel injection.

A crank angle sensor 154 is associated with the crankshaft 46. This sensor 154 provides not only a signal of crank angle but by comparing that signal with time an indication of crankshaft rotational speed.

There is also provided a crankcase pressure sensor 156 that senses the pressure in one or all of the crankcase chambers 72. By measuring crankcase pressure at a particular crank angle, engine air induction amount can be determined.

Engine or operator demand is determined by a throttle position sensor 158 that operates in conjunction with a throttle valve 78 so as to determine this function.

The ECU 148 operates on a feedback control condition and thus, an air fuel ratio sensor 160 is provided that communicates with the combustion chambers 68 or exhaust port 92 of at least one of the cylinder. Preferably, an oxygen sensor is utilized for this purpose, although other types of devices may be employed.

In order to provide a good indication of the fuel/air ratio, it is important that the oxygen sensor 160 is positioned so that it will sense the combustion products near the completion of combustion and before a fresh charge of air is delivered to the combustion chamber 68. Therefore, and as best shown in FIG. 4, the oxygen sensor 160 is provided so that its probe opens into the cylinder bore 60 at a point that is disposed slightly vertically above the upper edge of the exhaust port 92. In this way, the oxygen sensor 160 will be in a position to receive combustion products immediately before opening of the exhaust port 92 and most positively before the opening of the scavenge ports 88, 90 so that it will sense the combustion products at the time combustion has been substantially completed.

Engine temperature is sensed by an engine temperature sensor 162.

The temperature of the cooling water drawn from the body of water in which the watercraft or outboard motor 40 is operated is measured by a water temperature sensor 164. As has been noted, those sensors described may be just typical of any of the wide variety of sensors utilized for engine control.

In addition to controlling timing of firing of the spark plugs 152 and initiation and duration of fuel injection by the fuel injectors 102, the ECU 148 may also control a lubricating system. This is comprised of an oil supply system including a pump 166 that sprays oil into the intake passages 80 for engine lubrication. In addition, some forms of direct lubrication may be also employed for delivering lubricant directly to certain components of the engine.

It has already been noted that the adjustment of the angle of the propeller 54 will change the vertical position of its high-speed exhaust discharge and accordingly the back pressure. Thus, there are provided additional sensors that sense factors that will indicate this depth. These comprise an engine height sensor 168 that is mounted on the outboard motor 40 and which senses its height adjustment. Also, a trim angle sensor 170 is provided which senses the adjusted trim angle.

Other sensors may also be employed for control and some of these are associated with the engine 44 or the outboard motor 40 itself. These may include an engine vibration or knock sensor 172 and a neutral sensor 174. The neutral sensor 174 cooperates with the aforenoted forward, neutral, reverse transmission and will provide an indication of when the watercraft is operating in neutral.

Also shown schematically in FIG. 2 is a watercraft speed sensor 176 and a watercraft pitch sensor 178 that will sense the condition of the watercraft relative to the body of water and again indirectly the back pressure in the exhaust system. There is provided an atmospheric pressure sensor 180.

Because of the importance of the exhaust back pressure, as already noted, there is also provided an exhaust back pressure sensor 182 in one of the exhaust manifolds 94.

Of course, the sensors described are only typical of those types of sensors that may be employed. The components of the system as thus far described may be considered to be conventional and for that reason, where any component has not been illustrated or described in detail, reference may be had to conventional or known structures with which to practice the invention. The present invention deals primarily with a piston ring assembly. Accordingly, the following is a more detailed discussion of such a construction having features, aspects and advantages of the present invention.

Figure 6A:
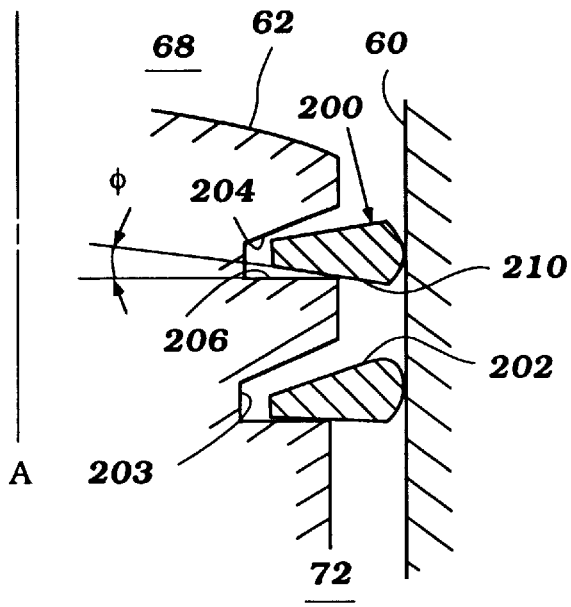
Figure 6B:
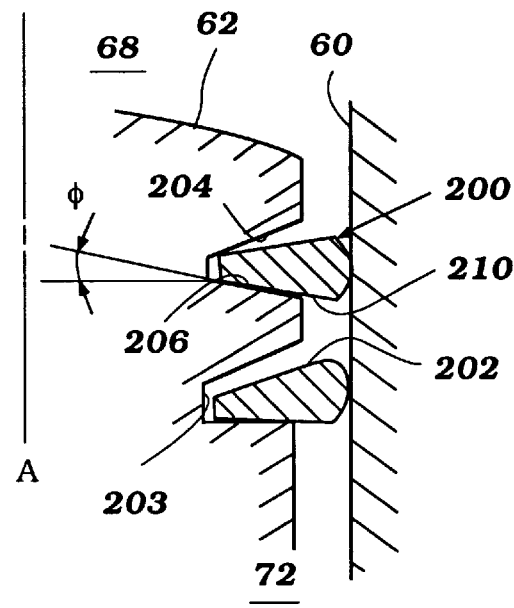

With reference now to FIG. 6, a cut-away cross-section of a piston ring assembly arranged and configured in accordance with the present invention is illustrated therein. As discussed above, the piston 62 is received within the cylinder bore 60 for reciprocation. The piston 62 necessarily has a smaller overall outside diameter than the cylinder bore 60 in order to allow the reciprocation. Desirably, the piston operates within the oil bathed cylinder bore 60 of the internal combustion engine 44.

To seal the combustion chamber 68 from the balance of the cylinder and crankcase chamber 72, the piston 62 is provided with at least one piston ring. In the illustrated embodiment, the piston 62 ring assembly utilizes two piston rings, a top compression ring 200 and a lubricant control ring 202, to maintain the seal. The rings may be made of iron, steel or other suitable materials in any known manner. The lubricant control ring 202 is received within a lower groove 203 as illustrated in FIGS. 6(*a*) and 6(*b*).

The top compression ring 200 is retained in a top ring groove 204 in the piston 62. The top ring groove 204 circumscribes an uppermost portion of the piston 62 in a well-known manner; however, the shape may be slightly refined in the illustrated embodiment. The illustrated ring groove 204 generally comprises a bottom face 206 that is preferably horizontal before thermal expansion (FIG. 6(*a*)). Horizontal as used herein is defined as normal to an axis of reciprocation A of the piston. The bottom face will then deform downward as a result of stresses induced by thermal expansion as the piston is directly exposed to heat generated within the combustion chamber 62 while the engine is operated.

The top compression ring 200 is sized for confinement within and around the radially outwardly opening annular top ring groove 204. The top ring groove 204 and the top compression ring 200 desirably act, along with a head of the piston 62, as a first barrier for at least partially sealing off a lower end of the combustion chamber 68 from a lower portion of the cylinder below the top compression ring 200. Accordingly, the top compression ring 200 projects radially out of the groove 204 and has an outer surface which contacts the cylinder bore wall 60, which surface slidably bears against the same cylinder wall. The inner diameter of the compression ring 200 is desirably greater than the diameter of the inner surface of the ring groove 204 such that a gap is defined between the two members.

With reference to FIG. 6(*a*), the illustrated piston ring 200 has a bottom face 210 that is angled such that the ring tapers toward its inner diameter. The bottom face 210 of the piston ring is desirably inclined at an angle φ from horizontal. This angle may range from about zero degrees to about 10 degrees; however, the exact angle is a function of the deformation caused by thermal expansion which is itself a function of the thermal expansion coefficient of the material from which the piston is manufactured. This angle desirably also may accommodate any thermal deformation of the piston ring itself resulting from thermal expansion of the ring.

With reference now to FIG. 6(*b*), the piston ring 200 is shown properly seated with its bottom face 210 abutting and resting on the bottom face 206 of the piston ring groove 204. During the heating of the piston by the combustion within the combustion chamber, the piston thermally expanded and deformed such that the bottom face 206 of the ring groove 204 was deflected downward by the same angle as the bottom face of the ring 200 was formed with. Thus, the ring groove bottom face 206 was deflected downward at an angle φ. Accordingly, the ring's bottom face 210 is properly forced against a substantial portion of the ring groove's bottom face 206 when the piston is on an upstroke and a full-load is applied thereto.

The enveloping placement of the rings and ring grooves results in less localized sliding friction during the movement of the ring relative to the groove. Thus, wear may be decreased as the localized contact surfaces of the earlier embodiments have been minimized or removed. Additionally, the seal is improved as the friction between the rings and the groove walls is decreased. Thus, the efficiency of the engine is enhanced by the improved ring and ring groove interaction.

Figure 7A:
FIGS. 7(a) and 7(b) are graphical illustrations of surface friction between the bottom face of the piston ring and the bottom face of the piston ring groove as related to an arrangement having certain features, aspects and advantages of the present invention and a previous arrangement, respectively.
Figure 7B:
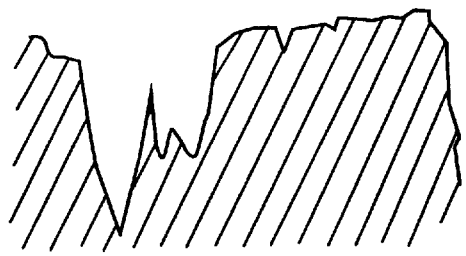

With reference now to FIGS. 7(*a*) and 7(*b*), graphical presentations of friction within the top compression ring wear are illustrated. As illustrated in FIG. 7(*b*), the prior embodiments, without the slightly sloping bottom face of the piston ring which substantially accommodates the known deformation of the piston ring groove surfaces, had increased localized friction as compared to that of the present invention. In the present invention, the top compression ring and the groove surface has reduced friction overall and in localized positions. Accordingly, the present invention results in reduced or slower ring and/or groove wear and increased ring tension (i.e., better sealing abilities).

Although this invention has been described in terms of a certain embodiment, other embodiments apparent to those of ordinary skill in the art also are within the scope of this invention. Thus, various changes and modifications may be made without departing from the spirit and scope of the invention. Accordingly, the scope of the invention is intended to be defined only by the claims that follow.

What is claimed is:

1. A piston and piston ring assembly for a direct injection internal combustion engine, the piston comprising a head, at least two circumferential ring grooves positioned proximate the head and a reciprocating axis, the upper groove comprising a lower face, a first ring positioned within the upper ring groove and a second ring positioned within the second ring groove, the first ring having a top surface and a bottom surface wherein the bottom surface is inclined by a first angle relative to a reference plane defined as normal to the reciprocating axis, wherein the first angle is substantially equal to an angle defined between a first plane defined by the lower face before thermal expansion and a second plane defined by the lower face after thermal expansion such that the bottom surface of the first ring will be substantially flush with the lower face of the ring groove after thermal expansion.

2. The piston and piston ring assembly of claim 1, wherein the angle defined between the first plane and the second plane is adjusted to accommodate any thermal expansion of the first ring which results in a deformation of the angle between the top surface and the bottom surface.

3. The piston and piston ring assembly of claim 1, wherein the first ring is a compression ring.

4. The piston and piston ring assembly of claim 1, wherein the engine is a two-stroke engine.

5. The piston and piston ring assembly of claim 1, wherein the piston has only two ring grooves.

6. A piston and piston ring assembly for use within a cylinder of an internal combustion engine, the piston and piston ring assembly comprising a piston having a piston ring groove and a reciprocating axis, the piston ring groove having a lower face, a piston ring positioned in the piston ring groove, the piston ring having a bottom surface adjacent the lower face, the bottom surface inclined relative to a plane normal to the reciprocating axis, an angle defined between the lower face and the bottom surface when the piston ring and the piston have not thermally expanded which is equal to an angle defined by the lower face relative to the plane normal to the reciprocating axis when the piston and piston ring have thermally expanded.

7. The piston and piston ring assembly of claim 6, wherein the piston ring is a compression ring.

8. The piston and piston ring assembly of claim 6 further comprising a second piston ring groove and a lubricant control ring seated within the second piston ring groove, wherein the second piston ring groove is arranged to one side of the first piston ring groove and the combustion chamber is arranged to the other side of the first piston ring groove.

9. The piston and piston ring assembly of claim 6, wherein the first piston ring is axially spaced from an inner wall of the piston ring groove.

10. The piston and piston ring assembly of claim 9, wherein the second piston ring is axially spaced from an inner wall of the piston ring groove.

11. The piston and piston ring assembly of claim 8, wherein the first piston ring is longitudinally spaced along the reciprocating axis from an upper face of the first piston ring groove.

12. The piston and piston ring assembly of claim 7, wherein the first piston ring is capable of translation within the first piston ring groove when the piston changes movement direction.

13. The piston and piston ring assembly of claim 6, wherein the first piston ring further comprises a top surface and the top surface slopes upward toward its outside diameter.

* * * * *